US007244327B2

(12) United States Patent
Joyner et al.

(10) Patent No.: US 7,244,327 B2
(45) Date of Patent: Jul. 17, 2007

(54) METHOD AND APPARATUS FOR SUBSTANTIALLY LIFTING ERASABLE MARKED IMAGES FROM A MARKING SURFACE OR THE LIKE

(76) Inventors: Kenny Lamont Joyner, P.O. Box 94662, Pasadena, CA (US) 91109-4662; Dean Marsh Steiding, 1819 Marcella St., Simi Valley, CA (US) 93065

( * ) Notice: Subject to any disclaimer, the term of this patent is extended or adjusted under 35 U.S.C. 154(b) by 89 days.

(21) Appl. No.: 10/831,092

(22) Filed: Apr. 23, 2004

(65) Prior Publication Data

US 2005/0236096 A1 Oct. 27, 2005

(51) Int. Cl.
*B32B 37/00* (2006.01)

(52) U.S. Cl. ........................ 156/241; 156/247; 156/281

(58) Field of Classification Search ................ 156/230, 156/234, 238, 239, 240, 241, 247, 249, 281
See application file for complete search history.

(56) References Cited

U.S. PATENT DOCUMENTS 4,967,210 A 10/1990 Frazier
5,900,094 A 5/1999 Santini et al.
6,260,885 B1 7/2001 Massimo
2002/0027360 A1 3/2002 Massimo

FOREIGN PATENT DOCUMENTS

JP 2001341378 11/2001

OTHER PUBLICATIONS

"R-Tape" AT60—Clear Choice Techincal Bulletin.
"POLI-TAPE" 160—Clear Application Tape.

*Primary Examiner*—James Sells

(57) ABSTRACT

A method for substantially lifting dry-erasable marked images (4) from a whiteboard surface (2) includes providing a rolled transparent adhesive film sheet (6) for lifting the image, a rolled paper sheet (8) having a shade or color that is contrasting to the image (4) allowing for clearer viewing and easy handling of the lifted image when the sheets (6,8) are adhered together. The sheet rolls (24,26) are positioned, utilizing an elongated handling unit (12,36) that enables dispensing and joining of the sheets (6,8). An urging slit (16) is provided on the unit to urge consistent adherence together of the two sheets (6,8) when pulled through. At least one suction cup (30) is provided on at least one side of the handling unit (12,36) that is provided, in order to mount the unit (10,34) on or near the whiteboard surface (2). Permanent mounting and motorized operation alternatives and a surface cleaning method are provided.

15 Claims, 5 Drawing Sheets

METHOD AND APPARATUS FOR SUBSTANTIALLY LIFTING ERASABLE MARKED IMAGES FROM A MARKING SURFACE OR THE LIKE

FIELD OF THE INVENTION

This invention relates to image lifting, specifically to lifting or transferring of dry-erasable images that are marked on impervious marking surfaces like whiteboards or the like.

BACKGROUND OF THE INVENTION

Erasable marking surfaces such as whiteboards are commonly used in offices, schools, homes and other locations where erasable marking is desired. These marking surfaces are designed to be marked, written or drawn on, with erasable dry-erase compositions such as markers for the purposes of planning, programming, designing, drawing presenting or scheming. The images that are created on these marking surfaces are erasable, which can be problematic if it is desired that the image be saved for future referencing. Additionally, compositions used to mark on these marking surfaces often leave visible remains and residue after erased, which is commonly termed “ghosting”.

Currently, if an image is to be saved, the most common and practical solution is to somehow attempt to prevent the image from being erased, which is not always feasible or controllable, or simply to try and manually duplicate, re-write or transfer the information onto a portable marking surface like a notepad or other such portable marking surface. Additionally, removal of ghosting is currently attempted with spray cleaners and wipes that often leave smears and residue.

Another option that is considerably less common, is to electronically capture or transfer the image via a high-tech solution like a camera, scanner or other electronic device. For example U.S. Pat. No. 6,337,681 (2002) to Martin, which is assigned to Smart Technologies Inc, as a product branded a “SmartBoard” and U.S. Pat. No. 6,232,962 (2001) to Davis, which is assigned to Virtual Ink Corp. as a product branded a “Mimio” describe such electronic transfer devices that are relatively well known in the industry. These types of devices are often cost-prohibitive and/or impractical due to their intricacy and sophistication. Furthermore, these devices can also prove to be relatively complicated to port and operate.

For example, U.S. Pat. No. 5,900,094 (1999) to Santini et al. which is assigned to Binney & Smith, Inc. describes a manual image transfer or lifting method that is relatively less sophisticated, however the method includes intricate and possibly volatile steps that include an aqueous, resin and release agent application. This method also requires the use of the specific specialized marker composition that is described, rather than standard markers that are commonly used in the marketplace. When the image is transferred using this method, the image is lifted on paper and would be viewable in its’ mirrored orientation, not in the exact orientation as it was originally marked.

While the above described devices and methods fulfill their respective, particular objectives and requirements, the aforementioned patents do not describe image transfer methods and devices that are relatively simple, inexpensive, portable and easy to implement.

Accordingly, there is a need for an inexpensive, low-tech, simple, versatile, portable, easy to use method that can be used to conveniently transfer or lift marked images and effectively remove “ghosting” on whiteboards or the like.

SUMMARY OF THE INVENTION

The invention comprises a portable method for substantially lifting dry-erasable marked images that are marked on a whiteboard or the like, which enables the image to be saved and ported for future referencing. The invention can be adapted to enable implementation when permanently mounted on or near a whiteboard surface. A method is also included that provides for cleaning of the whiteboard surface.

DRAWINGS—FIGURES

In the drawings, closely related figures have the same number but different alphabetic suffixes.

Figure 1A:
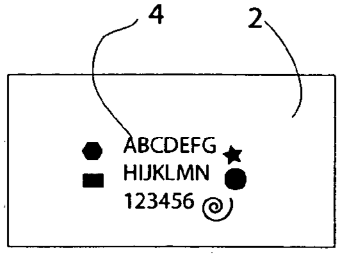
FIGS. 1A to 1E show elevational views of the basic method of substantially lifting or cleaning a dry-erasable image on a whiteboard surface.

| DRAWINGS-Reference Numerals | |
|---|---|
| 2 | Whiteboard surface |
| 4 | Marked image (indices) |
| 6 | Adhesive film sheet |
| 8 | Paper sheet |
| 10 | Preferred housing unit |
| 12 | Housed handling unit |
| 14 | Wide opening |
| 16 | Urging slit |
| 18 | Urging ridge |
| 20 | Spacer ridge |
| 22 | Access rod |
| 24 | Adhesive film roll |

-continued

| DRAWINGS-Reference Numerals | |
|---|---|
| 26 | Paper roll |
| 28 | Core |
| 30 | Suction cup |
| 32 | Suction cup neck |
| 34 | Alternative unit |
| 36 | Open frame handling unit |
| 38 | Urging rods |
| 40 | Motor/control |
| 42 | Upper rail |
| 44 | Lower rail |
| 46 | Power cord |
| 48 | Hand crank/control |
| 50 | Roller assembly |
| 52 | Mounting assembly |

DETAILED DESCRIPTION

General Method Utilizing a Handling Unit

The method will generally include providing a transparent adhesive laminated film sheet that is derived from a film roll, a paper sheet that is derived from a paper roll, a handling unit (housing or open frame) that strategically holds the rolls and suction cups that are attached to the handling unit to mount the unit to the whiteboard surface. The handling unit is designed to include the facilitating of strategically joining the two sheets together effectively.

Handling Unit Utilized for Preferred Method

Housing Unit

A preferred embodiment of the housing unit 10 used in the preferred method is illustrated in FIGS. 6A–6C and 7A–7B (isometrics). The unit has an elongated rectangular housing unit 12 having four sides and two opposite closed ends. Each closed end has two equally spaced circular inward protrusions that extend perpendicularly from the inside face of each side. The protrusions are of a predetermined length and diameter to enable proper securing and free rotation of an extruded sheet film roll 24 and an extruded sheet paper roll 26 when the cores 28 of the rolls are slipped over them at each end.

One side of the housing 12 forms a wide opening 14 of a predetermined height to enable easy access to the film 24 and paper rolls 26. The opening 14 is of a predetermined width that is equal to or greater than the width of the rolls. The opposite side of the housing 12 forms a narrow urging slit 16 of a predetermined height that is equal to or less than the combined thickness of the unrolled film sheet 6 and the unrolled paper sheet 8. The housing 12 forms an urging ridge 18 at each external edge of the slit 16 that protrudes perpendicularly from the housing 12 face a predetermined distance to adequately force the two sheets 6,8 together when they are pulled through the slit 16.

Another side of the housing 12 forms two holes spaced equally from each end, to enable secure external fastening of a suction cup 30 through each whole. The same side of the housing 12 forms an external perpendicular spacer ridge 20 at each end the housing 12, that run the width of the housing, spaced equally from each end. The spacer ridge 20 protrudes a predetermined distance from the exterior face of the housing 12 that is equal to or less than the depth of the suction cup's neck 32 to provide for lateral restriction of the housing 12 unit when mounted to, keeping the housing unit from excessively rocking to and fro from the tension that results when the suction cups 30 are fully compressed and the film/paper rolls 24,26 are unwound.

Film/Paper Roll

At least one substantially transparent sheeted film roll 24 is provided mounted inside of the housing 12, mounted in an orientation to freely unroll through the wide opening 14 on the housing 12. The film 24 is laminated on one side with an adhesive that is of a predetermined tackiness or stickiness to enable effective adhering to and lifting of a dry-erasable marked image from a whiteboard surface or the like, while simultaneously enabling effective removal, pulling or peeling of the film from the whiteboard surface with minimal pulling force and leaving little or no adhesive residue. It is preferred that the non-adhesive side of the film be an erasable surface and markable with a dry-erasable marked image similar to the whiteboard to allow for marking on and erasing from the resulting lifted image.

At least one sheeted paper roll 26 is provided—mounted inside of the housing 12, mounted to freely unroll over an access rod 22 and through the slit 16 on the housing 12. The paper is of a color or shade that is contrasting to the image(s) that is marked on the whiteboard surface. The paper has a predetermined finish that will enable the film roll 24 to effectively adhere to the relevant side of the paper. This paper sheet that is pulled from the paper roll 26 also provides a way to easily and conveniently handle the sticky film sheet that is pulled from the film roll 24 when the two sheets are adhered together.

The overall width and diameter of the film roll 24 and the paper roll 26 provided can vary, depending on the ultimate film/paper length, width and weight and the ultimate housing unit size that is preferred.

Suction Cups

Preferably two suction cups 30 are provided—fastened to a side of the housing unit 12 with a screw or the like to enable mounting the unit directly onto the whiteboard surface 2. The cups 30 are of a common and readily available design and can be obtained from a plurality of sources. The cups 30 are engineered to enable adequate mounting for the weight of the housing unit 14 when fully loaded. It is preferred that a release tabs are formed on the cups 30 to enable simple and convenient release of the suction when the tabs are lifted. The cups 30 form a neck 32 that is fastened directly to the housing unit 12, attaching perpendicular from the unit's face.

Access Rod

Preferably an elongated access rod 22 is provided—secured inside of the housing 12, horizontally positioned closest to the wide opening 14 on the housing 12. The opposite ends of the rod 22 are attached to the respective opposite inside faces of the housing 12 ends via a screw or the like. The rod 12 is vertically positioned slightly off-centered towards the paper roll 26.

Method/Operation

Basic Method

The novel method of the invention in its' most basic form is illustrated elevationally in FIG. 1A–1E and FIGS. 2A–B. FIG. 1A illustrates a dry-erasable marked image on an erasable whiteboard surface.

Figure 1B:
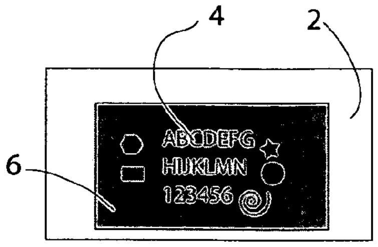

FIG. 1B illustrates Step 1 which involves strategically applying a transparent adhesive laminated film sheet 6 onto the whiteboard surface 2, directly over the marked image 4 that is to be lifted. This is best accomplished by adhering one end of the sheet 6, then progressively adhering the sheet onto the whiteboard surface 2 all the way across to the opposite end over the marked image 4.

Figure 1C:
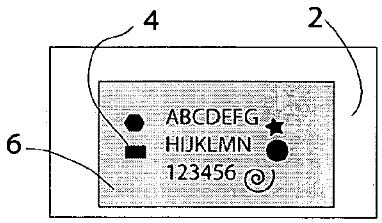

FIG. 1C illustrates Step 2 which involves progressively pressing the film sheet 6 against the whiteboard surface 2 to improve adhesion of film 6 to the marked image 4.

It should be noted that Steps 1 & 2 above can be effectively combined into a single step by ensuring effective pressure is being applied, simultaneously—as the film sheet is being applied to the whiteboard surface (over the marked image).

Figure 1D:
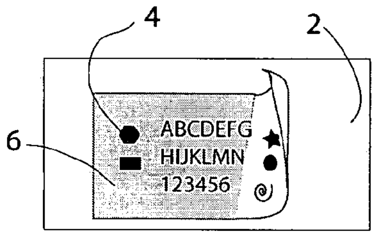
Figure 1E:
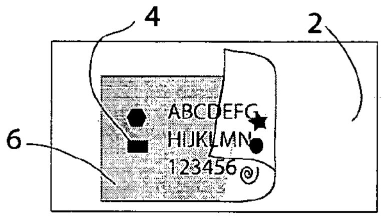

FIG. 1D–E illustrates Step 3 which involves progressively removing or peeling the film sheet 6 from the whiteboard surface 2 to substantially lift the dry-erasable marked image 4 from the whiteboard surface 2.

Figure 2A:
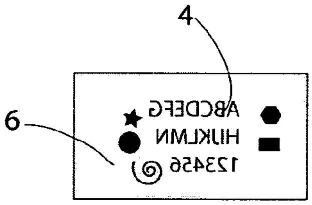
FIGS. 2A to 2B show elevational views of the resulting lifted image from the basic method shown in its’ original and mirrored orientation
Figure 2B:
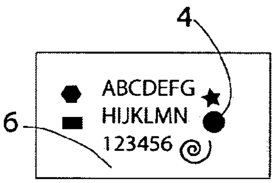

FIGS. 2A–B illustrates the resulting lifted dry-erasable marked image on the adhesive film sheet in it's reverse reading and right reading views respectively.

Figure 3:
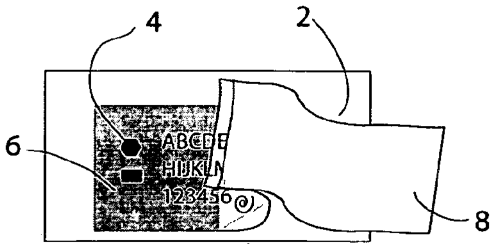
FIG. 3 shows an elevational view of an additional step for adhering a contrasting and/or handling sheet.

FIG. 3 illustrates a preferred additional basic Step 3, which involves strategically applying a paper sheet 8 that is contrasting in shade or color of the marked image 4 to the adhesive side of the film sheet 6 to enable clearer viewing and easy handling of the lifted image on the adhesive film sheet 6.

Preferred Method

The novel method of the invention in it's preferred form using the preferred or alternate embodiment of the housing unit 10 used in the preferred method is illustrated in FIGS. 5A–E (top views).

Figure 5A:
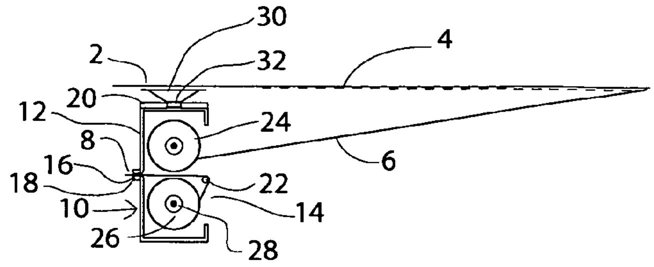
FIGS. 5A to 5E show a cross-sectional plan view of a preferred method utilizing a preferred handling unit.
Figure 4:
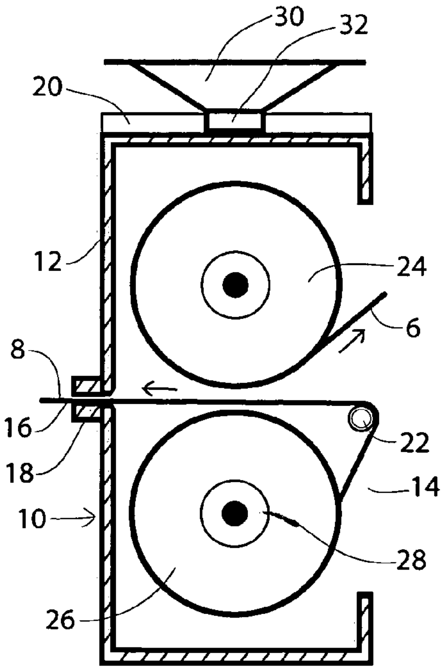
FIG. 4 shows an enlarged cross-sectional plan view of a preferred method utilizing a preferred handling unit.

FIG. 5A illustrates Step 1 which involves strategically mounting the unit 10 onto the whiteboard surface 2 on a side of the image 4 that is to be lifted, by fully compressing the suction cups 30.

FIG. 5A further illustrates Step 2 unwinding the paper sheet 8 from the roll 26, feeding it over the access rod 22 and through the formed urging slit 16.

FIG. 5A further illustrates Step 3 unwinding the adhesive film sheet 6 from the film roll 24, pulling it towards the opposite side of the image 4, directly over the image 4 (or portion thereof) that is to be lifted.

Figure 5B:
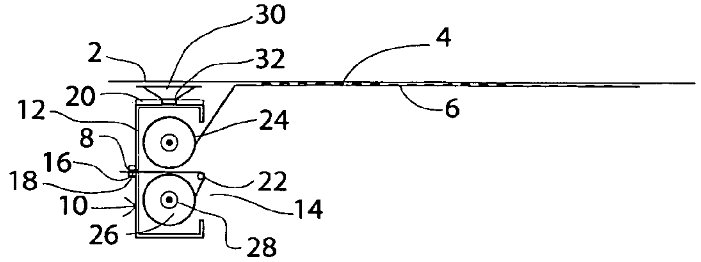

FIG. 5B illustrates Step 4 which involves progressively pressing the film sheet 6 against the whiteboard surface 2 to improve adhesion of the film 6 to the marked image 4.

Figure 5C:
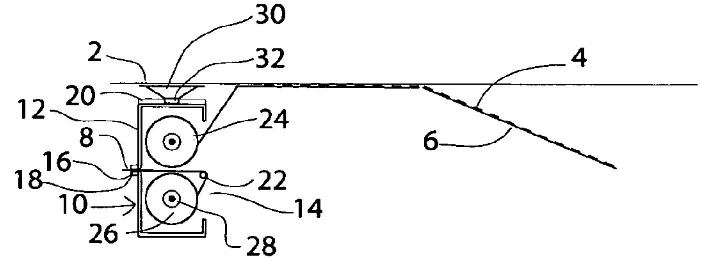

FIG. 5C illustrates Step 5 which involves progressively removing or peeling the film sheet 6 from the whiteboard surface 2 to substantially lift the dry-erasable marked image 4 from the whiteboard surface 2.

Figure 5D:
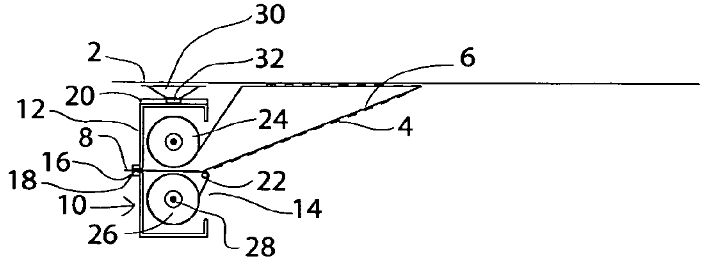

FIG. 5D illustrates Step 6 which involves strategically adhering the film sheet 6 onto the paper sheet 8, directly over the access rod 22. This can best be accomplished when the film sheet 24 has been peeled away slightly over fifty percent of the distance away from the whiteboard surface 2 by folding the film sheet 6 back onto itself (non-adhesive side over non-adhesive side).

Figure 5E:
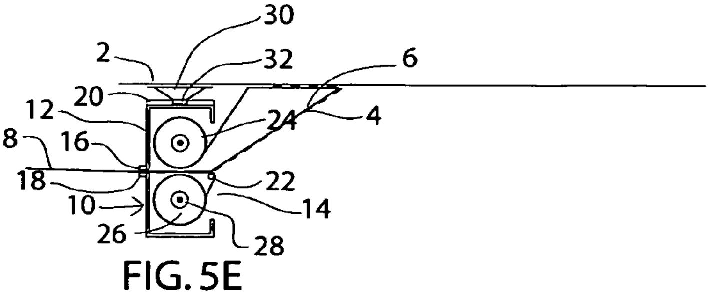
Figure 6A:
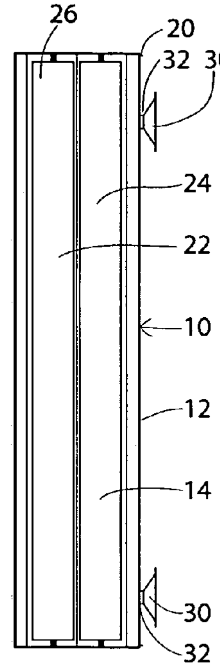
FIGS. 6A to 6C show elevational views of the preferred method utilizing a preferred non-transparent housing unit.
Figure 6B:
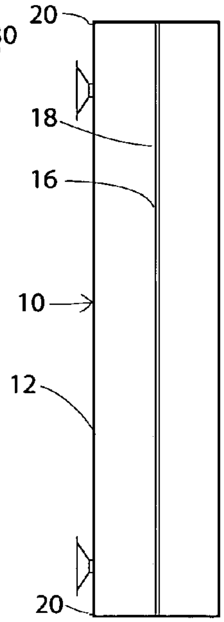
Figure 6C:
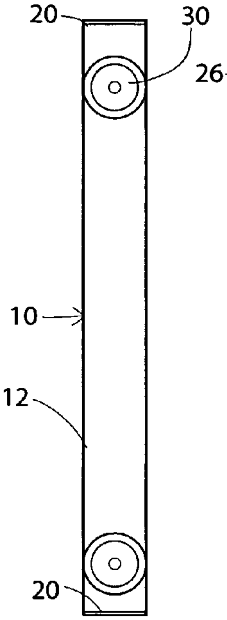
Figure 7A:
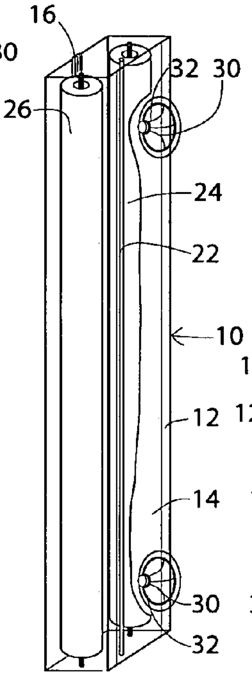
FIGS. 7A to 7B show elevational isometric views of the preferred method utilizing a preferred transparent housing unit.
Figure 7B:
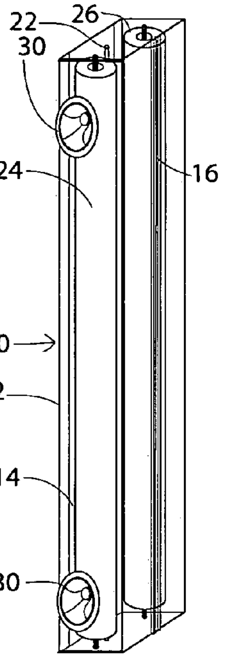
Figure 8A:
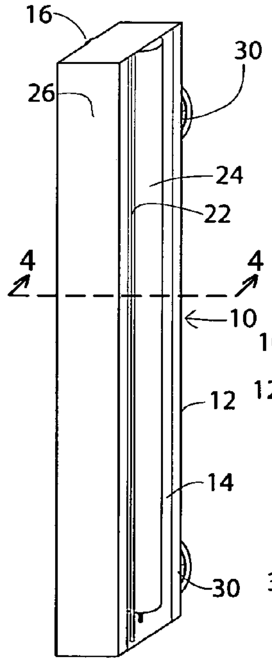
FIGS. 8A to 8C show elevational isometric views of an alternate method utilizing a non-transparent housing unit.
Figure 8B:
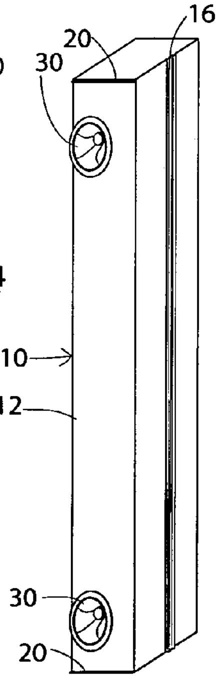
Figure 8C:
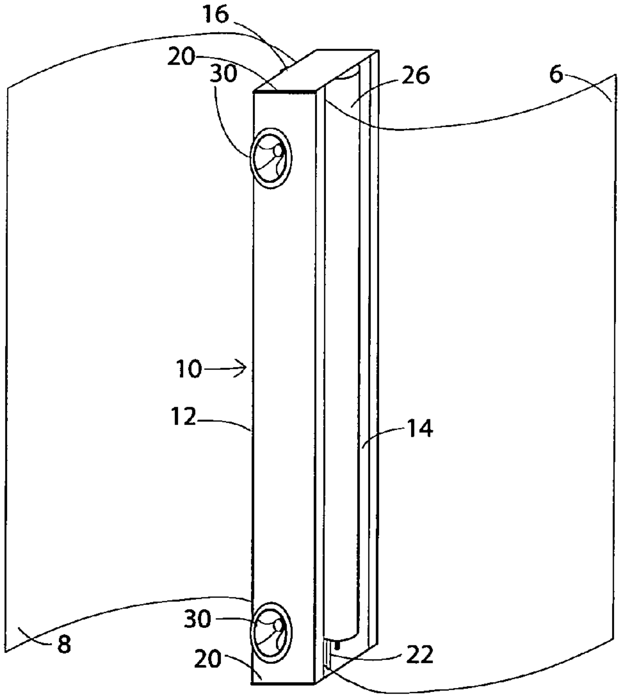
Figure 9C:
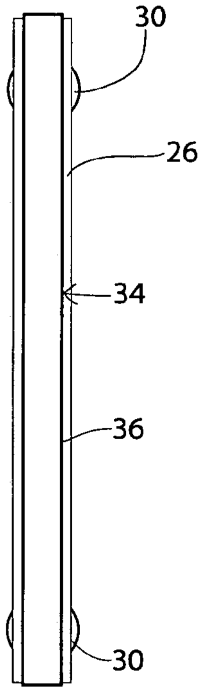
FIGS. 9A to 9C show elevational views of an alternate method utilizing an open frame unit.
Figure 9B:
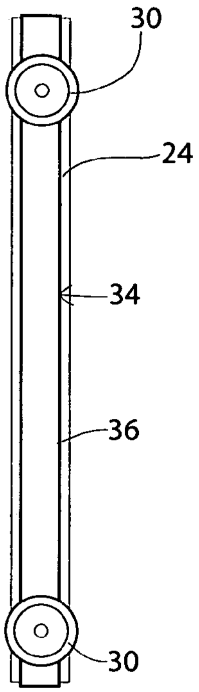
Figure 9A:
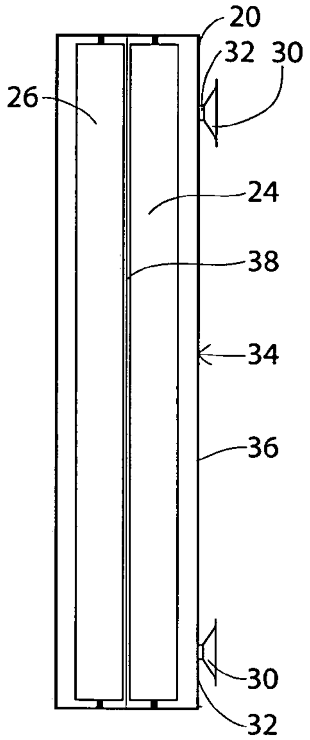
Figure 10:
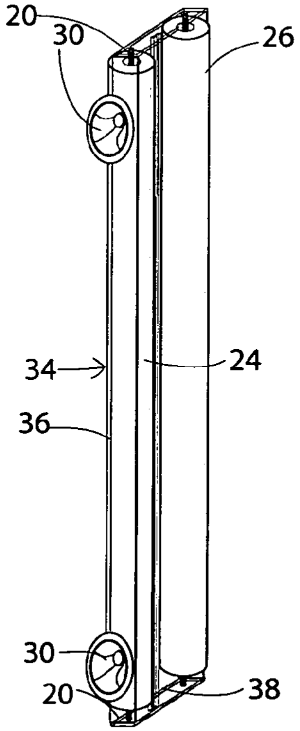
FIG. 10 shows elevational isometric views of an alternate method utilizing a transparent open frame unit.
Figure 11:
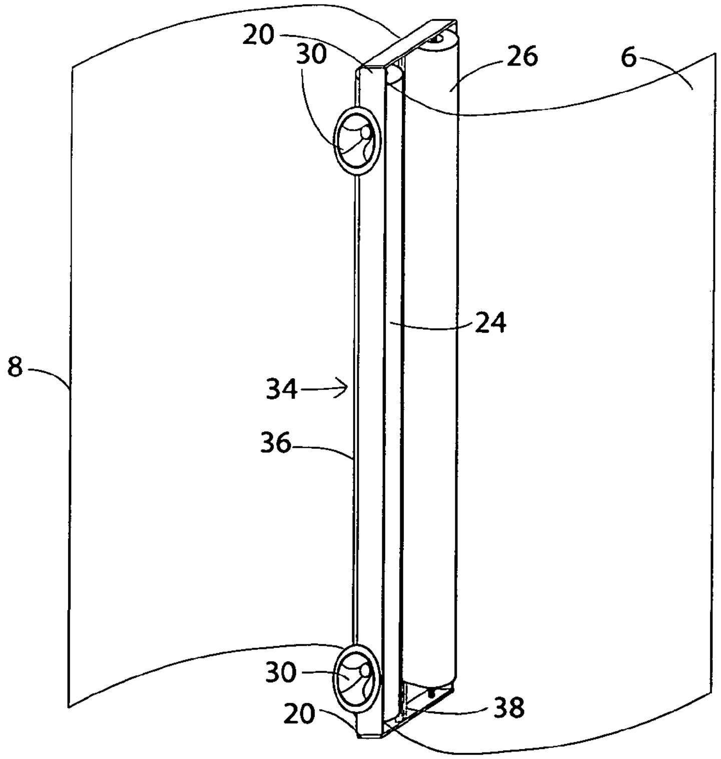
FIG. 11 shows elevational isometric views of an alternate method utilizing a non-transparent open frame unit.
Figure 12:
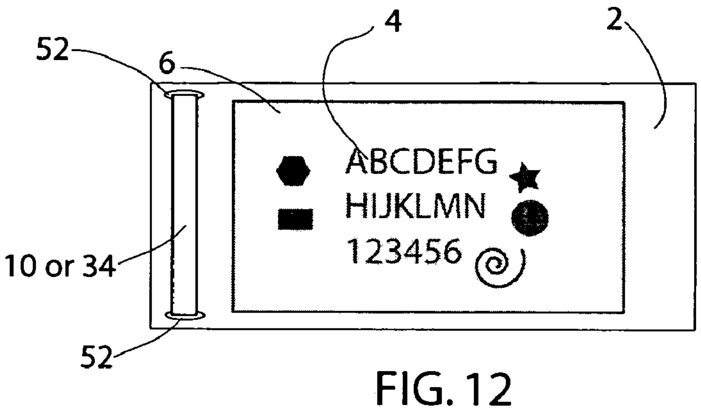
FIG. 12 shows an elevational view of an alternate method utilizing a non-transparent elongated housing mounted on a whiteboard surface.

FIG. 5E illustrates Step 7 which involves progressively pulling the paper sheet 8 through the urging slit 16, eventually bringing the portion that has the film sheet 6 adhered to (with the lifted image) it, completely through the slit 16. It is preferred that the combined film and paper sheet 6,8 that results, be cut from the roll(s) 24,26 and removed.

The lifted image can then be saved and ported for future referencing.

It is preferred that the non-adhesive side of the film would be markable and erasable similarly to the whiteboard surface 2 which allows for subsequent marking on and erasing from the lifted image. Adding another layer of film over the newly marked lifted image can preserve the subsequent marked image, and accordingly repeated if desired. This allows you to continually add, erase and preserve erasable marked images to the resulting lifted image(s).

Alternate Handling Unit Utilized for Preferred Method

Open Frame Unit

An alternative embodiment of the unit utilized in the method is illustrated in FIGS. 9A–C, 10 and 11. The unit 34 has an elongated rectangular open frame unit 36 instead of an enclosed housing 12. The frame 36 has an upper and lower flat sides with similar connecting ends. Each end forms two inward protrusions that protrude perpendicular from the interior of the sides. The protrusions are of a predetermined length and diameter to enable proper securing and free rotation of an extruded sheet film roll 24 and an extruded sheet paper roll 26 when the cores 28 of the rolls are slipped over them at each end. The lower flat side has a plurality of holes to allow attachment of the suction cups 30 perpendicular from the exterior face of the lower side.

Preferably two elongated urging rods 38 are secured to the center of the interior side faces of the frame, spaced apart a predetermined distance to create a gap or slit that has a height that is equal to or less than the combined thickness of the unrolled film sheet 6 and the unrolled paper sheet 8. to adequately force the two sheets 6,8 together when they are pulled through the gap. The opposite ends of the rods 38 are attached to the respective opposite interior side faces of the frame 36 via a screw or the like.

Alternate Handling Units Utilized for Alternate Method

Motorized/Controlled

Figure 13:
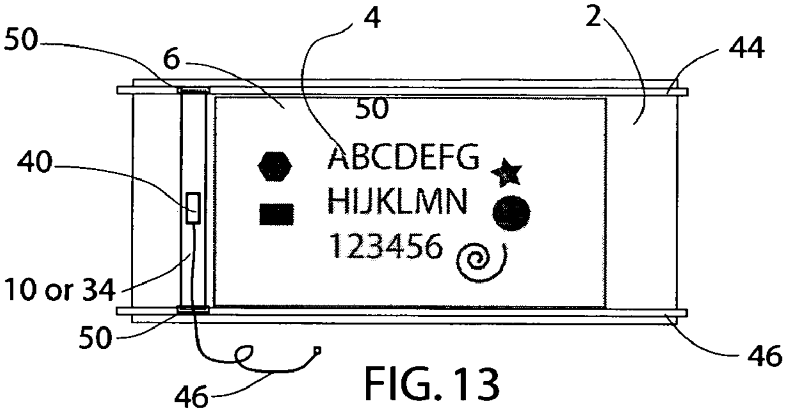
FIG. 13 shows an elevational view of an alternate method utilizing a housing unit having motorized and control ability with a housing unit mounted on a whiteboard surface.

An additional alternative embodiment of the unit utilized in the method is illustrated in FIG. 13. A motor w/relevant controls 40 and power cord 46 is operatively connected to the unit (in a preferred or alternate embodiment) 10,34 to enable motorized operation, which automatically moves the unit back and forth parallel to the whiteboard surface 2. An upper rail 42 is mounted at the top of the whiteboard surface 2 and a lower rail 44 is mounted at the bottom of the whiteboard surface 2. A bracketed roller assembly is operatively connected to the top and bottom of the unit 10,34 to enable the unit to slide/roll back and forth on the rails for usage.

Manual Crank

Figure 14:
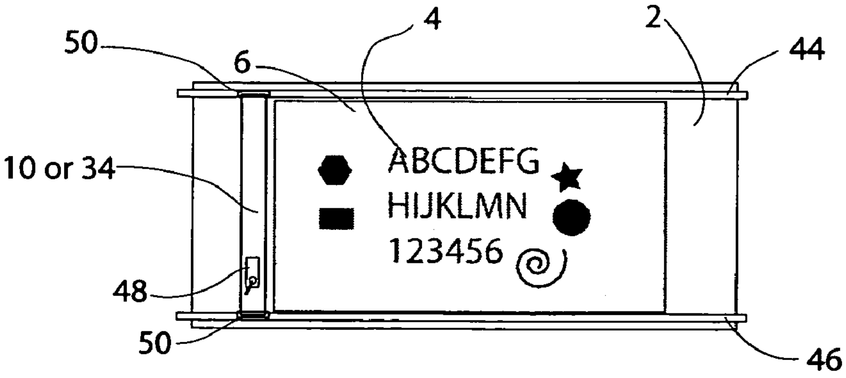
FIG. 14 shows an elevational view of an alternate method utilizing a housing unit having manual cranking ability, mounted on a whiteboard surface.

An additional alternative embodiment of the unit utilized in the method is illustrated in FIG. 14. A manual hand crank w/relevant controls 48 is operatively connected to the unit (in its' preferred or alternate embodiment) 10,34 to enable manual cranking operation, which moves the unit back and forth parallel to the whiteboard surface 2. An upper rail 42 is mounted at the top of the whiteboard surface 2 and a lower rail 44 is mounted at the bottom of the whiteboard surface 2. A bracketed roller assembly is operatively connected to the top and bottom of the unit to enable the unit to slide/roll back and forth for usage.

Mounting Assembly Utilized for Alternate Method

The above alternate methods can be alternatively mounted adjacent to or directly over the whiteboard surface 2 by using at least one operatively connecting bracketed mounting assembly 52 that attaches to the exterior surface of the handling unit 12,36 and attached on or near the mounting surface using a screw or the like.

Accordingly, the reader will see that the image lifting method of this invention provides a simple, economical versatile and low-tech way to substantially lift dry-erasable marked images and substantially remove "ghosting" and residue from whiteboards or the like. Furthermore the invention has additional advantages in that it allows for image lifting in a way that is easily portable between locations, which enable easy sharing. It allows for image lifting in a way that is lightweight, and it allows for continued marking and editing of the lifted image. It does not have an absolute requirement for low-voltage or high-voltage electrical power.

While the above description contains much specificity, these should not be construed as limitations on the scope of the invention, but rather as exemplifications of a few basic preferred and alternate methods and embodiments thereof. Many other possible variations are obvious to individuals skilled in the art.

For example:

The methods could be modified to include a plurality of film and/or paper sheets to enable varying preferred efficient results. For instance multiple film and/or paper sheets/rolls of varying widths can be provided depending on the size of an image or portion thereof that is desired to be lifted, or multiple background/handling sheets/rolls of varying color, shade and/or pattern can be provided to enable multiple varying contrast results.

The methods could be relevantly modified to work more specifically on a horizontal plane or a vertical plane.

The separately derived adhesive sheet/roll and handling or background sheet/roll can be derived from a single adhesive laminated film sheet/roll having a removable protection liner or backing. Thus the methods can therefore be modified to enable and facilitate using the liner or backing as the handling and background sheet, thereby substituting the need for a separately derived handling and background sheet/roll.

A non-substantially transparent adhesive laminated paper sheet or other relevant material, which would concede the inability to view the lifted image in the exact orientation that it was originally marked, could substitute the adhesive film sheet. In this instance a second substantially transparent sheeted material can be adhered to, which allows for handling of the lifted image.

The film and paper sheet could be different widths to allow for an exposed adhesive strip if the paper sheet is narrower than the film sheet, which would expose adhesive allowing convenient adherence of the lifted image to a surface for future referencing, or the film sheet could be narrower than the paper sheet, which would allow for a greater alignment tolerance when aligning the two sheets for adhering together.

The units utilized in the method can be mounted by using relevant magnets, instead of the suction cups presented. This is particularly possible with a whiteboard surface that has a metal liner, backing, laminate or other relevant component.

The adhesive sheet/roll and handling/background sheet/roll can be separately housed and can thereby optionally include the ability to urge adherence as previously defined. In addition, the rolls can be positioned side-by-side or any other adjacency variation thereof.

The separating or cutting of the adhesive sheet and handling/background sheet from the roll(s) can be accomplished by integrating an inline cutting blade or the like, instead of the use of scissors or other peripheral cutting device.

The units utilized in the method are shown with a rectangular profile for simplification in interpreting of the drawing images. The structure and profile of the housing or open assembly can vary in design, which for instance, can include an extruded assembly and/or a single injection-molded part. Furthermore, the design can be modified ergonomically.

Under certain conditions, the methods as described can also work effectively to substantially lift erasable chalk marks from a chalkboard.

Thus the scope of the invention should be determined by the appended claims and their legal equivalents, rather than by the methods and embodiments illustrated.

We claim:

1. A method of substantially lifting dry-erasable marked images from a whiteboard surface, which method comprises:

(a) strategically applying at least one means for substantially lifting a dry-erasable marked image onto said whiteboard surface, positioned directly over the marked image that is to be lifted;

(b) strategically applying pressure to said means for substantially lifting wherein said means for substantially lifting will be urged to effectively adhere to said marked image to the extent that the marked image can be effectively substantially lifted;

(c) strategically removing said means for substantially lifting from said whiteboard surface, whereby the integrity of the means for substantially lifting is maintained and at most minimal residue is left, thereby effectively and cleanly substantially lifting and transferring said marked image from the whiteboard surface to said means for substantially lifting.

2. The method of claim 1, further comprising; providing at least one means to enable and facilitate easy handling of a marked image that is substantially lifted by using said means for substantially lifting, thereby enabling the substantially lifted marked image to be saved and stored for future referencing.

3. The method of claim 2, further comprising; providing at least one means to enable and facilitate urged adherence of said substantially lifting means and said easy handling means, thereby effectively joining them together in a way that is substantially consistent.

4. A method of substantially lifting or cleaning a dry-erasable marked image from a whiteboard surface, which method comprises;

(a) strategically applying at least one sheet of substantially transparent film having a laminated pressure-sensitive adhesive on one side, directly over said marked image;

(b) strategically applying pressure to said film sheet wherein the sheet will be urged to effectively adhere to said marked image to the extent that the marked image can be effectively substantially lifted from said whiteboard surface;

(c) strategically removing said film sheet from said whiteboard surface, whereby the integrity of the film sheet is maintained and at most minimal adhesive residue is left, thereby effectively and cleanly substantially lifting said marked image from the whiteboard surface and transferring the marked image to said film sheet.

5. A method of substantially removing deeply embedded dry-erasable marked images or ghosting and residue from a whiteboard surface or the like, which method comprises;

(a) strategically applying at least one sheet having a substantially tacky laminated pressure-sensitive adhesive on one side directly over said ghosting and residue;

(b) strategically applying pressure to said sheet wherein the sheet will be urged to effectively adhere to said ghosting and residue to the extent that they can be effectively substantially lifted from said whiteboard surface;

(c) strategically removing said sheet from said whiteboard surface, thereby effectively substantially lifting said ghosting and residue from the whiteboard surface and transferring said ghosting and residue to said sheet.

6. The method of claim 2, further comprising; deriving said means for substantially lifting a dry-erasable marked image and said means to enable and facilitate easy handling of a marked image that is substantially lifted by using said means for substantially lifting from at least one unwinding roll.

7. The method of claim 6, further comprising; utilizing a housing means to strategically and operatively facilitate securing said at least one unwinding roll.

8. The method of claim 7, further comprising; utilizing at least one means to facilitate positioning said housing at least near to said whiteboard surface.

9. The method of claim 7, further comprising; utilizing at least one suction cup to facilitate positioning said housing onto said whiteboard surface.

10. The method of claim 1, further comprising; utilizing a substantially clear adhesive laminated film for said means for substantially lifting.

11. The method of claim 10, further comprising; utilizing an erase allowable surface on the side that is opposite the adhesive side of said clear adhesive laminated film.

12. The method of claim 2, further comprising; utilizing a bond paper for said means to enable and facilitate easy handling.

13. The method of claim 1, further comprising; utilizing at least one contrasting color to said marked image as said means to enable and facilitate easy handling.

14. The method of claim 7, further comprising; utilizing an operatively connected cranking means to strategically position said housing means along said whiteboard surface.

15. The method of claim 7, further comprising; utilizing an operatively connected motorized means to strategically position said housing means along said whiteboard surface.

* * * * *